(12) United States Patent
Jennison

(10) Patent No.: US 6,964,936 B1
(45) Date of Patent: Nov. 15, 2005

(54) METHOD OF MAKING MAXIMALLY DISPERSED HETEROGENEOUS CATALYSTS

(75) Inventor: Dwight R. Jennison, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 262 days.

(21) Appl. No.: 10/383,672

(22) Filed: Mar. 6, 2003

(51) Int. Cl.[7] .......................... B01J 31/00; B01J 37/00; B01J 21/00; B01J 23/00; B01J 20/00
(52) U.S. Cl. ....................... 502/104; 502/110; 502/111; 502/117; 502/207; 502/240; 502/243; 502/244; 502/246; 502/250; 502/251; 502/252; 502/253; 502/260; 502/261; 502/262; 502/302; 502/303; 502/304; 502/325; 502/326; 502/327; 502/328; 502/329; 502/330; 502/331; 502/332; 502/333; 502/334; 502/339; 502/342; 502/344; 502/345; 502/346; 502/347; 502/348; 502/355; 502/439; 502/415
(58) Field of Search .................. 502/104, 110, 111, 502/117, 207, 240, 243, 244, 246, 250, 251, 502/252, 253, 260–263, 325–334, 339, 342, 502/344–348, 355, 439; 423/659; 427/255.7, 427/250, 534; 204/192.1

(56) References Cited

U.S. PATENT DOCUMENTS

| | | | |
|---|---|---|---|
| 4,035,260 A | * | 7/1977 | Schmitt et al. ............ 502/185 |
| 4,038,175 A | * | 7/1977 | Bhasin .................... 208/144 |
| 4,153,518 A | | 5/1979 | Holmes et al. |
| 4,293,725 A | * | 10/1981 | Beach et al. .............. 585/523 |
| 4,444,898 A | * | 4/1984 | Schwartz et al. ........... 502/62 |
| 4,701,352 A | | 10/1987 | DeLuca et al. |
| 5,047,379 A | * | 9/1991 | Alyea et al. .............. 502/79 |

(Continued)

OTHER PUBLICATIONS

Bogicevic et al., "Role of surface vacancies and water products in metal nucleation: Pt/MgO(100)," Sandia National Laboratories, May 1999, 1-4.

(Continued)

*Primary Examiner*—Cam N. Nguyen
(74) *Attorney, Agent, or Firm*—Elmer A. Klavetter

(57) ABSTRACT

A method of making a catalyst with monolayer or sub-monolayer metal by controlling the wetting characteristics on the support surface and increasing the adhesion between the catalytic metal and an oxide layer. There are two methods that have been demonstrated by experiment and supported by theory. In the first method, which is useful for noble metals as well as others, a negatively-charged species is introduced to the surface of a support in sub-ML coverage. The layer-by-layer growth of metal deposited onto the oxide surface is promoted because the adhesion strength of the metal-oxide interface is increased. This method can also be used to achieve nanoislands of metal upon sub-ML deposition. The negatively-charged species can either be deposited onto the oxide surface or a compound can be deposited that dissociates on, or reacts with, the surface to form the negatively-charged species. The deposited metal adatoms can thereby bond laterally to the negatively-charged species as well as vertically to the oxide surface. Thus the negatively-charged species serve as anchors for the metal. In the second method, a chemical reaction that occurs when most metals are deposited on a fully hydroxylated oxide surface is used to create cationic metal species that bind strongly both to the substrate and to metallic metal atoms. These are incorporated into the top layer of the substrate and bind strongly both to the substrate and to metallic metal atoms. In this case, these oxidized metal atoms serve as the anchors. Here, as in the previous method, nanoislands of catalytic metal can be achieved to increase catalytic activity, or monolayers or bilayers of reactive metal can also be made.

21 Claims, 5 Drawing Sheets

M = metal atom; A = metal-ion or isolated negative adspecies anchor

U.S. PATENT DOCUMENTS

| | | | | |
|---|---|---|---|---|
| 5,246,737 A | * | 9/1993 | Muradov | 427/307 |
| 5,290,748 A | * | 3/1994 | Knuuttila et al. | 502/228 |
| 5,372,982 A | * | 12/1994 | Hietala et al. | 502/226 |
| 5,403,620 A | * | 4/1995 | Kaesz et al. | 427/252 |
| 5,418,056 A | * | 5/1995 | Noguchi et al. | 428/323 |
| 5,455,072 A | * | 10/1995 | Bension et al. | 427/255.7 |
| 5,480,730 A | | 1/1996 | Swisher | |
| 5,589,234 A | * | 12/1996 | Mori et al. | 427/597 |
| 5,880,055 A | * | 3/1999 | Knuuttila et al. | 502/103 |
| 5,965,629 A | | 10/1999 | Jung et al. | |
| 5,968,664 A | * | 10/1999 | Heberger et al. | 428/463 |
| 5,989,648 A | * | 11/1999 | Phillips | 427/456 |
| 5,989,768 A | | 11/1999 | Little | |
| 5,997,958 A | | 12/1999 | Sato et al. | |
| 6,037,019 A | | 3/2000 | Kooyer et al. | |
| 6,159,896 A | * | 12/2000 | Zoeller et al. | 502/326 |
| 6,534,431 B1 | * | 3/2003 | Suntola et al. | 502/60 |
| 6,551,653 B1 | * | 4/2003 | Hatke et al. | 427/171 |
| 6,790,476 B1 | * | 9/2004 | Jennison et al. | 427/255.7 |
| 6,838,125 B2 | * | 1/2005 | Chung et al. | 427/562 |

OTHER PUBLICATIONS

Niu et. al., "Cu Interactions with $\alpha$-$Al_2O_3$ (0001): Effects of Surface Hydroxyl Groups vs. Dyhydroxylation by ar Ion Sputtering," Surface Science, 465, 2000, 163.

Kelber et. al., "Copper wetting of $\alpha$-$Al_2O_3$ (0001): theory and experiment," Accepted for publication in Surface Science, Surface Science, 446, 2000, 76-88.

Chambers, "Laminar Growth of Ultrathin Metal Films on Metal Oxides: Co on Hydroxylated $\alpha$-$Al_2O_3$ (0001)," Science, 297, 2002, 827-831.

Hammer, "Adsorbate-Oxide Interactions during the NO+CO Reaction on MgO(100) Supported Pd Monolayer Films," Physical Review Letters, 89, 1, 2002.

* cited by examiner

M = metal atom; A = metal-ion or isolated negative ad-species anchor

A: 0.3 ML Co
B: 0.8 ML Co
C: Co metal
D: CoO
E: $Co_2O_3$

METHOD OF MAKING MAXIMALLY DISPERSED HETEROGENEOUS CATALYSTS

This invention was made with Government support under Contract No. DE-AC04-94AL85000 awarded by the Department of Energy. The Government has certain rights in the invention.

This application is related to U.S. patent application Ser. No. 09/576,919, filed on May 23, 2000.

BACKGROUND OF THE INVENTION

The invention describes a method for making a heterogeneous catalyst and, more particularly, to a method for making a metal heterogeneous catalyst with monolayer (ML) or sub-ML metal thickness.

Catalyst technology plays a critical role in the production of materials related to many facets of the world economy including petroleum refining, pharmaceutical productions, chemical processing and production, and environmental cleanup. Heterogeneous catalytic reactions are widely used and are commonly characterized by reactions performed with the reactant(s) and product(s) in the fluid or gas phase and the catalyst in the solid phase. In heterogeneous catalytic reactions, the reaction occurs at the interface between phases; that is, the interface between the fluid or gas phase of the reactant(s) and product(s) and the solid phase of the supported catalyst. Hence, the properties of the surface of a heterogeneous supported catalyst are significant factors in the effective use of that catalyst. Specifically, the surface area of the active catalyst, as supported typically on a metal oxide substrate, and the accessibility of that surface area to reactant chemisorption and product desorption are important. These factors affect the activity of the catalyst, defined by the rate of conversion of reactants to products. The chemical purity of the catalyst and the catalyst support have important effects on the selectivity of the catalyst, which is the degree to which the catalyst produces one product from among several products, and the lifetime of the catalyst.

Most heterogeneous catalysts are composed of a selected combination of active material, promoter and support. Catalysts with high surface areas are desirable to reduce the cost of material and to increase the activity of the catalyst (that is, the product production rate per unit weight). Active catalytic materials for most non-biological chemical reactions come generally from the transition metals of the Periodic Table and are generally considered to include vanadium, iron, cobalt, nickel, molybdenum, ruthenium, rhodium, palladium, cadmium, tungsten, rhenium, osmium, iridium, platinum and mercury, although other metals are catalytic in specific reactions. Promoters are included to increase activity and stability and use compounds, particularly oxides, which include elements selected from lithium, sodium, magnesium, boron, potassium, calcium, barium, lanthanum, cerium, and thorium. The supports are typically chosen from materials that have high surface areas and may or may not contain sites active for catalyzing specific reactions and generally include Group IIa and IIIa elements, alkaline earth and transition metal oxides (such as $Al_2O_3$, $SiO_2$, $TiO_2$, and MgO, zeolites and activated carbon). Low surface area supports, or substrates, can also be used. These substrates include ceramics, such as the high temperature form of alumina, or metallic monoliths.

Generally, catalytic activity is proportional to catalyst active surface area. Therefore, a high specific area is desirable. That surface area must be accessible to reactants and products as well as to heat flow. The chemisorption of a reactant by a catalyst surface may be preceded by the diffusion of that reactant through the internal structure of the catalyst. To minimize cost and maximize catalytic activity, it would be desirable for metal catalytic materials to be deposited on supports at levels of sub-MLs to a few MLs in thickness. When the catalytic material is a metal and the support is an oxide, the metal deposited on the oxide surface generally does not wet the surface because the metal-to-oxide interaction is relatively weak. At room temperature, metal islands form on an oxide. Because it is known that reactions often occur at step sites, these islands, having many edges and steps, are desirable in this sense, but all interior metal material is in effect wasted. Thus a reduction in island size is highly desirable.

The morphology of the resulting metal layer is thus quite variable within several nanometers (nm) of the oxide surface, and the resulting interface is typically quite non-uniform and weak. To strengthen the interface, reactive metals are sometimes added, such as brazing compounds. However, it is sometimes undesirable for such metals to be added because they often react with the oxide to form an intermediate layer, which is poorly defined and contrary to the desired catalytic structure. Additionally, the shape of the particles on the support surface depends on the interfacial energy between the metal and the oxide, and can in principle vary from flat two-dimensional islands (if strong interactions are present) to three-dimensional amorphous or faceted objects having minimal contact to the oxide (if the interaction is very weak). The ability to control this shape by interfacial engineering of the adhesion energy would provide an additional tool for catalyst design.

Useful would be a method for producing a catalyst with maximally dispersed and controlled ML or sub-ML amounts of active material on a support in order to produce a more effective and more cost efficient catalytic material.

DESCRIPTION OF SPECIFIC EMBODIMENTS

A significant expense in catalyst manufacture is the cost of the precious metals needed. To improve efficiency, catalysts are often made with small three-dimensional (3D) metal particles, thereby achieving a high surface area per metal weight. If the method of manufacture involves the deposition of a metal (the catalyst) on an oxide surface (the support), normally, the metals grow as 3D islands. If the deposition is slow and at moderate temperature, the size of these islands can be remarkably uniform.

In the method of the present invention, anchors are made on or within the substrate surface to control the morphology of deposited reactive metal. In the first embodiment of the present invention, a catalyst is prepared comprising a metal material and a support material with near total surface hydroxylation to permit the key chemical reaction that achieves anchor formation and nanometer island stability. A promoter material can optionally be added. The catalytic metal is deposited on the hydroxylated support in a closed environment under vacuum conditions to form 2D (two-dimensional) laminar layers (FIG. 1 right) with deposition of one or two. ML on the oxide substrate, or 3D nanoislands with sub-ML deposition (FIG. 2), thus yielding maximal dispersion. More than one metal can be deposited as desired. Whether this is a one or two ML metal layer film or a sub-ML film depends not only on the amount deposited (as controlled by the deposition time and reactant metal availability) but also on the type of metal. For example, many transition metals such as Co will not form one ML structures because of the directional bonding within the metal caused by the d-electrons. Thus the thinnest completely covered surface has about two MLs of coverage. However, it is this directional binding that also makes the smallest 3D islands, produced for example with roughly ½ ML deposition, to be nanodispersed, with each island centered on one of the approximately ¹⁄₁₀ ML of metal ion anchors and having the steps or edges that have been shown to enhance catalytic activity for certain reactions (FIG. 2).

It is important to note that ultrathin metal films on an oxide support have been shown to have enhanced catalytic rates compared with thicker films for certain reactions, and that these rates can be about the same as those of nanoclusters. Thus, depending on the specific reaction and catalyst stability, one or two ML layers can be as or more useful than 3D nanoislands.

Figure 1:
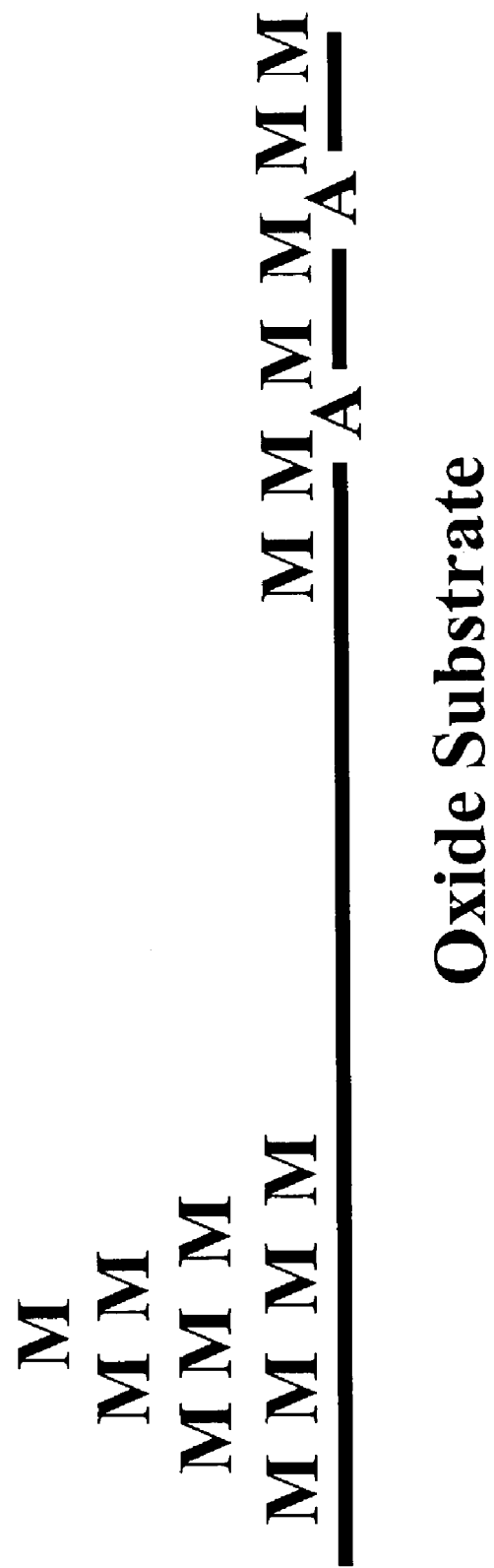
FIG. 1 schematically shows three-dimensional island (left) vs. one or two monolayer laminar growth modes (right) of metals on a metal oxide surface, the latter made using the method of this invention (M represents deposited metal atoms, A represents the "anchors" of the metal, either a metal-ion or a negatively-charged species).
Figure 2:
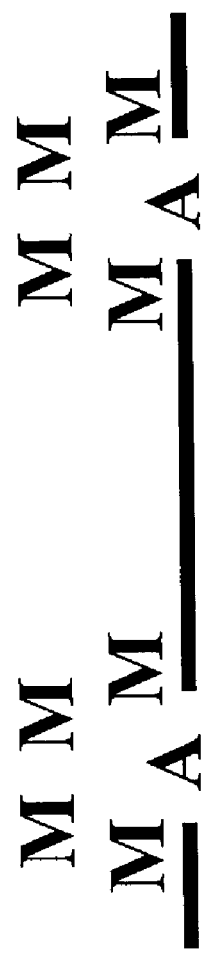
FIG. 2 schematically shows how sub-ML metal deposition using the method of this invention can produce maximally dispersed stepped islands at the nanometer scale.

FIG. 1 illustrates different growth modes. When the binding of isolated metal atoms is compared with those in two- or three-dimensional islands, the energetically-favored structure that will be obtained upon metal deposition from a vapor can be determined. For example, whether it is energetically favorable for deposited metal to spread out over the surface, leading to "wetting" and layer-by-layer metal growth with continued deposition, or to clump in three-dimensional islands (as illustrated in FIG. 1 left) depends on the metal/substrate interaction. In the method of this invention, the nearly completely hydroxylated oxide surface is seeded with approximately ¹⁄₁₀ MLs (between approximately 0.05 ML and approximately 0.2 ML) of oxidized metal ions (the anchors) that are produced by a chemical reaction that occurs between some of the initially deposited metal atoms and the fully hydroxylated surface, specifically

(1)

where M can be any metal. The transition state for the reaction is at the bridge between two O atoms. While strongly exothermic for Co, calculations have shown the reaction energy is exothermic or the reaction will occur due to a strong binding energy for the metals Cr, Fe, Ni, Cu, Mo, Ru, Rh, Pd, W, and Al, among others. While the noble metals are excluded, they can be deposited as MLs on a more reactive metal film such as Ru.

In the second embodiment of the present invention, an oxide surface is used that is only partially hydroxylated. This can be achieved for example by heating fully hydroxylated alumina (which is in fact any alumina that has been exposed to ambient conditions) to about 1000 K. In this case, the isolated hydroxyl groups now serve as the anchors and metal nanoislands grow around them at sub-ML depositions. In this case, noble metals as well as others will make nanoislands on an otherwise clean alumina surface (FIG. 2) or can be made to grow in a laminar fashion (FIG. 1 right).

Thus, the two embodiments differ in the nature of the anchors: metal cations in the first, and nearly isolated negatively-charged species, such as hydroxyl ions, in the second. They also differ in the treatment during manufacture: room-temperature conditions in the first, but high temperature annealing may be required in the second, unless the negatively-charged species can be deposited directly from other sources, as described below.

It is sometimes also possible to make useful structures that are metastable in that they are not energetically the globally preferred structures. For example, the stability of metal islands is related to the energy required to detach atoms from their edges on the surface. This sets a temperature for island growth on the surface (Ostwald ripening). Thus if this diffusion occurs at a given temperature, the metal adatoms move until they join a growing metal island. However, if the strength of the adatom binding could be increased to the point at which the adatom is pinned and cannot move at the manufacturing temperature, then the deposited metal will remain metastable, again producing a more uniformly dispersed surface (illustrated in FIG. 1 right and FIG. 2).

In the method of the present invention, a catalytic metal is deposited on a support by controlling the wetting characteristics of the support surface. In one embodiment, a fully hydroxylated surface is used to promote the chemical reaction (Eq. 1) described previously. In another embodiment, a sub-ML of negatively-charged species, such as hydroxyl groups, is produced not by high temperature heating but is introduced to the support surface. Thereby a metal either wets the surface in a controlled and uniform manner in a growth mode that promotes layered surfaces, or, with sub-ML deposition, forms nanoislands, thus achieving maximal dispersion of the expensive reactive metal. This also produces the greatest yield of the product per surface area. The supports are typically chosen from materials that have surfaces containing sites active for catalyzing specific reactions and generally include Group IIa and IIIa elements (such as materials comprising the elements boron, aluminum, gallium, and indium), alkaline earth materials (including materials comprising the elements beryllium, magnesium, calcium, strontium, and barium) and transition metal oxides (such as $Al_2O_3$, $TiO_2$, $SiO_2$, and MgO). Low surface area supports, or substrates, can also be used. These substrates include ceramics, such as alumina, or metallic monoliths.

Introduction of a negatively charged species to the surface can be accomplished by either depositing a negatively-charged species onto the oxide surface or by depositing a compound onto the surface that can dissociate or otherwise react to form a negatively-charged species. The adhesion or binding of the metal atoms to the surface is increased because the deposited metal ions can bond laterally to the negatively charged species as well as vertically to the oxide surface in a layer-by-layer metal growth mode.

Interestingly, the adhesion mechanism changes with the fraction of coverage of the negatively charged species on the surface of the support, such as a metal oxide support. With less than approximately ½ ML coverage of the negatively-charged species, the primary mechanism appears to be that the adjacent metal adatoms experience electrostatic interactions both vertically with the underlying $O^{2-}$ ions and laterally to the introduced negatively charged species, resulting in a deposited layer of greater uniformity and greater adhesion. However, when the surface is essentially fully covered, such as an essentially fully hydroxylated surface, certain metals produce a chemical reaction that leads to laminar growth of the metal film or the production of metal nanoislands, where the metal cations are incorporated into the top layer of the metal oxide (FIGS. 1 right and 2) and the metal cations bind ionically to the substrate as well as bound to neighboring metal ion, resulting in stronger interfacial binding (i.e., adhesion).

One useful negatively charged species is an adsorbed isolated hydroxyl group. These can be added to a clean and largely defect free oxide surface by means such as exposure of the surface to water (if the oxide readily dissociates water) and subsequent heating to remove a portion of them, to a water plasma, to a mixture of oxygen and water gas, to an oxygen plasma in the presence of a background of hydrogen gas, or to hydroxide-containing chemicals which readily dissociate on the surface leaving a hydroxyl group behind (such as specially made chemicals as XeOH).

Another useful negatively charged species is an adsorbed isolated oxygen atom. These can be added to the surface by exposure to and slow cooling in an oxygen plasma, by exposure to chemicals which dissociate on the surface leaving an oxygen atom behind, such as ozone or, in the presence of ultraviolet light, nitrous oxide ($N_2O$). Other useful negatively charged species are halogens such as fluorine, chlorine, bromine, and iodine, deposited, for example, by XeF or other like compounds.

In one embodiment, the negatively charged species is at a coverage of less than approximately one-half ML; theoretical calculations have indicated that a cover of one-third ML is optimal. To achieve approximately one-third ML OH coverage, a surface is first exposed to humid air sufficient to achieve essentially one ML coverage and then the surface is heated to approximately 1000–1200K, although lower temperatures may also work, to reduce the hydroxyl coverage to approximately one-third ML. Coverage as low as one-tenth ML or less can be achieved by controlling the deposition time in conjunction with the amount or concentration of reactant metal made available at the surface. Essentially any metal adatom can be deposited on an oxide surface for this embodiment. The requirement is that the atom be a positively charged adatom or bind sufficiently strongly to the site adjacent to the negatively-charged species that nanoislands or layer-by-layer growth can occur. Metal adatoms in Groups IB, IIB, IIIB, IVB, VB, VIB, VIIB, and VIII of the Periodic Table of Elements all satisfy these criteria.

Figure 3:
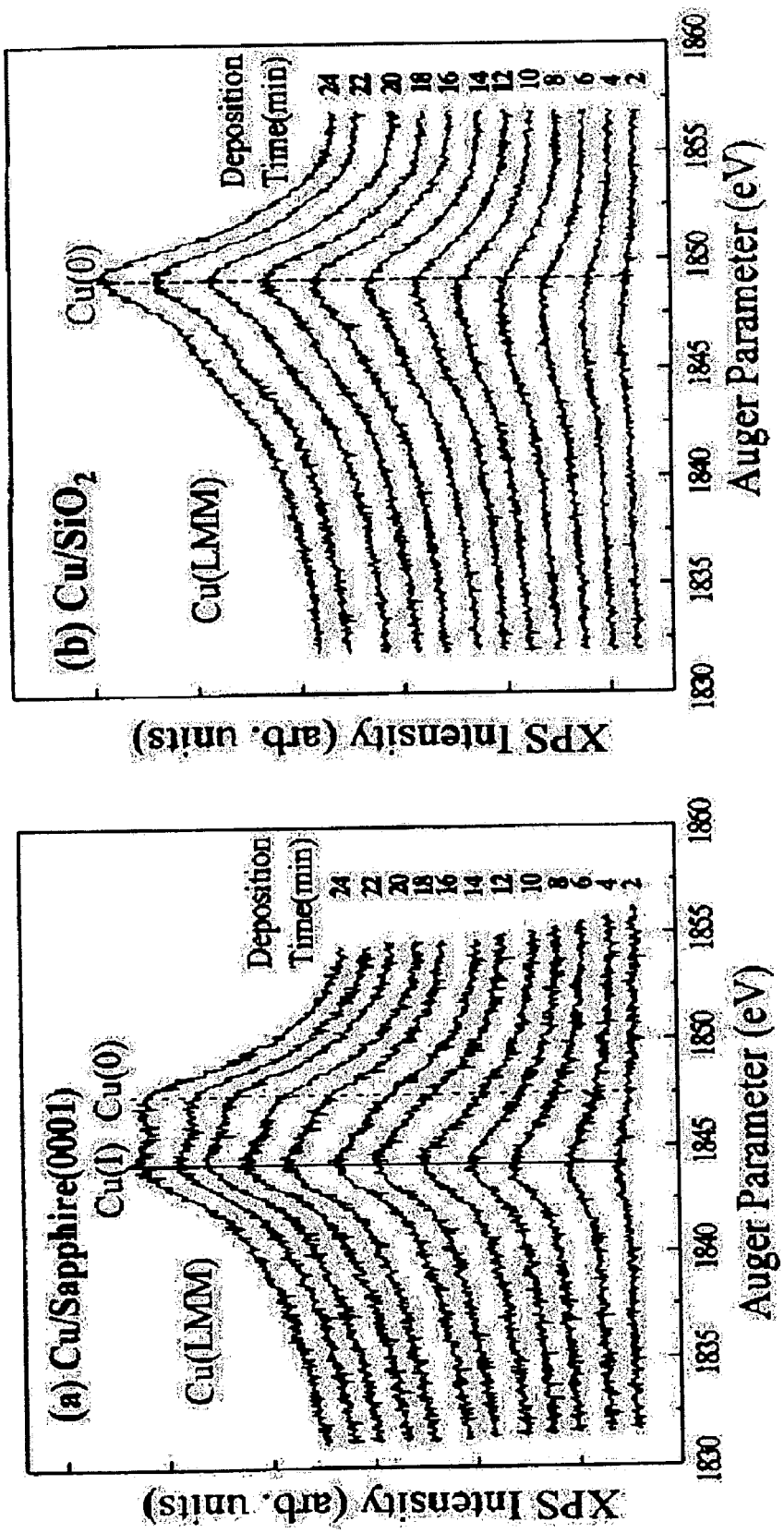
FIG. 3 Auger data shows (left) the adhesion of up to ⅔ MLs of a noble metal, Cu, produced by about ⅓ MLs of isolated hydroxyl groups on an alumina surface, which serve as anchors for the noble metal The first ⅓ ML of Cu atoms are ionized and only then are subsequent atoms metallic. When the OH groups are absent (right) no such behavior is seen.
Figure 4:
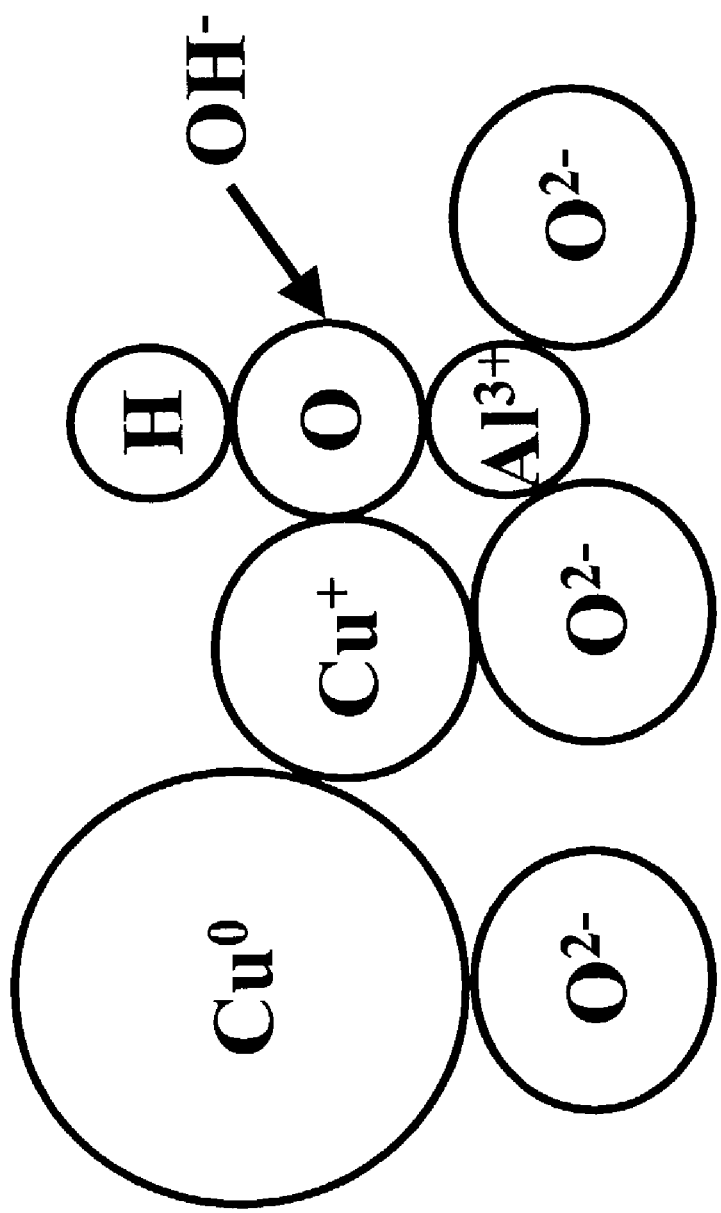
FIG. 4 shows schematically how the presence of isolated negatively-charged species cause the change in surface metal growth morphology by strongly binding adjacent metal atoms and serving as anchors, here demonstrated for a hydroxyl ion in the method demonstrated in FIG. 3.

In particular, the metal adatoms lithium, cobalt, potassium, yttrium, niobium, ruthenium, palladium, platinum, copper, silver, gold and aluminum have been investigated theoretically using the Born-Haber cycle calculations and have been shown to wet under the method of the present invention and to have increased adhesion. Copper (one of these adatoms) deposition on a ceramic surface, such as an alumina surface, is of particular interest because of its use in microelectronics; experimental evidence has validated the theoretical calculations that show the increased adhesion of copper to the oxide layer through the addition of a negatively-charged species according to the method of the present invention (FIG. 3 left). This indicates that noble metals will conform to this embodiment. The mechanism is schematically indicated in FIG. 4. Another metal adatom of interest is cobalt, as cobalt is being used in magnetic junction tunneling devices.

Metal adatoms can be deposited in this embodiment to promote nanoisland or layer-by-layer metal growth on a surface. More than one metal can be deposited by combining the metals or by combining a metal and a promoter material. Promoters are included to increase activity and stability and include compounds, particularly oxides, which include elements selected from lithium, sodium, magnesium, boron, potassium, calcium, barium, lanthanum, cerium, and thorium. One surface of interest includes aluminum oxide, as films of this material are easily produced on metals such as cobalt by Al metal deposition and oxidation at moderate temperatures. Aluminum oxide is also an important support material for heterogeneous catalysts and is an important structural ceramic. Another oxide surface of interest includes silicon dioxide ($SiO_2$) surfaces. On such a surface it may be necessary to sputter the surface to increase the density of available binding sites. Both metal oxide surfaces and non-metal oxide surfaces, such as silica oxide surfaces, present oxygen sites to which the positively-charged adatoms can bind and positively charged sites, such as from the aluminum and silicon ions, to which the added negatively-charged species can bind to promote the layer-by-layer growth mechanism. Thus, the methods described herein can apply to all of the numerous metal/oxide junctions.

The isolated adatoms are positively charged because they coordinate to (i.e. are adjacent to) negative ions on the surface. If the oxide surface is prepared to also have negatively charged adspecies upon it, these species attract metal adatoms and increase their binding (see FIG. 4), often by a factor of 2–3 or more, thus pinning them and causing wetting. Thus, the method of the present invention changes the wetting characteristics of the metal adatoms and increases the binding or adhesion characteristics of the metal adatom-oxide interface.

At the correct concentrations, these negatively charged species could dramatically increase the binding strength of the resulting metal overlayer, thus adding both stability and smoothness to the interfacial properties. The specific identity of the negatively charged species will affect the strength of the effect and other characteristics, such as whether products will be evolved by dissociation of the species in the presence of the metal overlayer. Because the negatively charged species repel each other, saturation coverage of the species excludes them from being on adjacent surface sites (FIG. 4). For example, on a basal (close packed) oxide surface, saturation typically occurs at one species for every three surface oxygen ions, thus leaving room for metal atoms to be deposited between them as shown in the data of FIG. 3 left and schematically in FIG. 4. The oxidizing potential of such sites can cause the first metal atoms to be oxidized, as illustrated in FIG. 3 left. If a negatively-charged species is present on the surface, the adjacent metal adatoms experience electrostatic interactions both vertically with the underlying $O^{2-}$ ions and laterally to the introduced negatively charged species, resulting in a deposited layer of greater uniformity and greater adhesion.

In one embodiment, the surface is cleaned to remove impurities. These methods include, for example, sonicating in a solvent, sputtering removal using an ion beam, burning off impurities by using an oxygen plasma or an ozone source, or annealing at high temperature in an oxygen ambient atmosphere.

The quality of the surface with respect to defects in the crystal structure or non-stoichiometries in the oxide composition can also be improved. This can be done, for example, by annealing at high temperature in an oxygen environment. This step can be combined with the cleaning step.

Negatively charged species can then be introduced to the surface. This can be accomplished, for example, by exposure of the surface to atoms or molecules, or to mixtures of atoms/molecules, at appropriate temperatures and pressures, so as to cause attachment to, or in the case of molecules spontaneous dissociation on, the surface, so as to produce and stabilize negatively-charged fragments on the surface, or to react with the surface to convert the surface into a surface with negatively-charged species on the surface, and so that negatively charged fragments remain after treatment. This introduction of negatively-charged species to a surface can be accomplished by gases reacting with the surface, which converts the surface into one with negatively-charged species on top of a close packed plane; by stimulating the dissociation of molecules on the surface using photon (for example, ultraviolet) or electron beams; or by exposure of the surface to a plasma which leaves such species on the surface at processing temperatures. The negatively charged species can be introduced at room temperature or at elevated temperatures. The metal is then deposited on the surface, wetting the surface in a controlled manner. In one embodiment, the first metal layer could be introduced simultaneously with the negatively charged species, wetting the surface in a controlled manner. An additional step of annealing the surface can be performed to provide additional stability to the interface system, as metastable interfaces have been observed to form with mixed neutral and positively charged metal atoms.

In one embodiment using hydroxyl ions as the negatively charged species introduced to the surface, when the surface cover of the hydroxyl ions is essentially complete (with essentially complete being greater than approximately 0.9 ML coverage), a chemical reaction (reaction (1) above) results from deposition of certain metals that results in metal cations (FIG. 5) that are incorporated and strongly bound in the top layer of the substrate and which also strongly bind neighboring metallic atoms. These ionic adhesion sites produce not only a stronger interface but also change the morphology of the metal. Instead of forming weakly bound three-dimensional islands, laminar growth may be achieved. Surface diffraction analyses, as demonstrated by Reflection High Energy Electron Diffraction data reveals the metal completely covers the surface (vs. forming 3D islands) at 2 ML exposure and crystalline metal growth is found by only a few atomic layers, resulting in a complete covering of the oxide surface in spite of a substantial lattice mismatch. However, only certain metals appear to function with this essentially fully hydroxylated surface. These metals include Cr, Fe, Co, Ni, Mo, Ru, Rh, W, and Al. This list of metals is based partially on experimental evidence and partially on density functional theory using local density approximation and generalized gradient approximation calculations.

When clean aluminum oxide is exposed to ambient conditions or approximately 1 Torr or more of water, the surface changes to one terminated entirely by OH. The surface is robust, requiring high temperature (up to 1000K) to remove sufficient OH to achieve a ⅓ ML coverage of OH. When using essentially complete OH coverage, high temperature heating is not required however. The metal oxide surface can simply be first cleaned and the metal atoms of interest deposited. The resulting deposition yields a metal strongly adhered to the oxide surface. For example, aluminum oxide was first cleaned, such as by sonication in a solvent such as acetone and isopropanol, and then in vacuum by oxygen plasma cleaning at room temperature, giving a surface essentially free of carbon with trace amounts (less than 0.1 ML) of metals such as Mg and Ca (which are probably subsurface). Co depositions were carried out at ambient temperature using an effusion cell. Analyses showed that a chemical reaction occurred to produce the cationic Co anchors, FIG. 5, and, with the exception of occasional surface defects or dust particles on the surface, there was no appreciable height variation across the film surface (as demonstrated by tapping atomic force microscopy data), showing that the Co fully covered the hydroxylated aluminum oxide surface with strong adatom-surface interactions (i.e., adhesion) and showing the absence of 3D islands.

In another embodiment wherein the negatively charged species (in this case, hydroxyl ions) is at a lower fractional coverage, copper is wetted onto a cleaned alumina surface. FIG. 3 left shows Auger electron spectroscopy data that demonstrates the layer-by-layer growth mode formation of copper on an oxide surface. The oxide surface used in this embodiment was a commonly used alumina surface, sapphire, a corundum modification of aluminum oxide ($Al_2O_3$). Exposure of the basal surface of sapphire to air resulted in a hydroxylated surface which, after cleaning and impurity (such as carbon) removal, was heated to approximately 1000K to achieve approximately ⅓ ML OH coverage, and was then wet by copper in a layer-by-layer growth mode. FIG. 3 left shows the spread of Cu(I) over the surface according to the method of the present invention, followed by metallic Cu only after about ⅓ ML of Cu(I) is achieved. First principles theoretical calculations show the effect is driven by those hydroxyl species which lie atop the oxide surface and that the ultimate increase in the adhesion of metallic copper to the surface, when the hydroxyl density is at saturation coverage, is 2.5 times the binding without the hydroxyl groups. Finally, the calculations show that the presence of copper metal causes dissociation of the hydroxyl groups to be energetically favorable, thus freeing hydrogen gas upon annealing and leaving only an extra oxygen atom at the interface, which still increases the binding by over twice that of an interface without the added negatively charged species.

The experimental data confirm the theoretical predictions. A sapphire sample was first cleaned by sonication in an aqueous solvent, such as acetone, methanol and deionized water prior to insertion into a vacuum system, with working pressures in the analysis chamber of approximately $1-5 \times 10^{-9}$ Torr and in the range of approximately $10^{-8}$ to $10^{-7}$ Torr in the sputter deposition chamber. Hydroxyl ions were introduced onto the sapphire surface by exposure to ambient air at moderate humidity, and then heated to approximately 1000K, resulting in a hydroxyl coverage of approximately one-third to one-half ML. The humid air can be air with a water content essentially at any value greater than approximately 5% and less than 100% and preferably a humidity value between 20 and 80%, assuming ambient pressure. The humidity should be at a sufficiently high value for approximately a ML of physi-sorbed water molecules to form. The copper was introduced into the vacuum chamber by magnetron source (other methods could include sputtering a Cu target or simple evaporation) thus depositing Cu onto the surface at room temperature. X-ray photoelectron and Auger electron spectroscopy (XPS and AES, respectively) measurements indicated that layer-by-layer growth (that is, wetting) occurred. The initial fractional Cu adlayer was oxidized to Cu(1) (FIG. 3 left), in agreement with theoretical predictions. The thermal stability of the deposited Cu layer was tested by annealing the Cu-modified surface to temperatures up to 1000 K in the ultra-high-vacuum system. A 0.35 ML coverage of Cu(1) was shown to be stable up to 1000 K, without change in either Cu($2p_{3/2}$) XPS intensity or in oxidation state.

Further Cu deposition produced a metallic layer bound to the Cu ions (as illustrated in FIG. 3 left). Further deposition showed all Cu visible on the surface was the metallic form. First principles calculations showed a full ML of Cu is bonded to the surface by an adhesive factor of 2.5 times that of Cu metal on the clean surface.

Experiments were similarly run on a sapphire sample with decreasing amounts of surface hydroxylation. Dehydroxylation was accomplished by argon ion bombardment, followed by annealing in a partial pressure of oxygen to restore surface quality (smoothness) and stoichiometry. Results demonstrated that the degree of hydroxyl surface coverage was critical in the capability of copper to wet sapphire, with the degree of wetting decreasing as the dehydroxylation increased (as illustrated for a non-hydroxylated oxide surface in FIG. 3, right side), thereby confirming theoretical calculations and the effects of using the method of the present invention.

Figure 5:
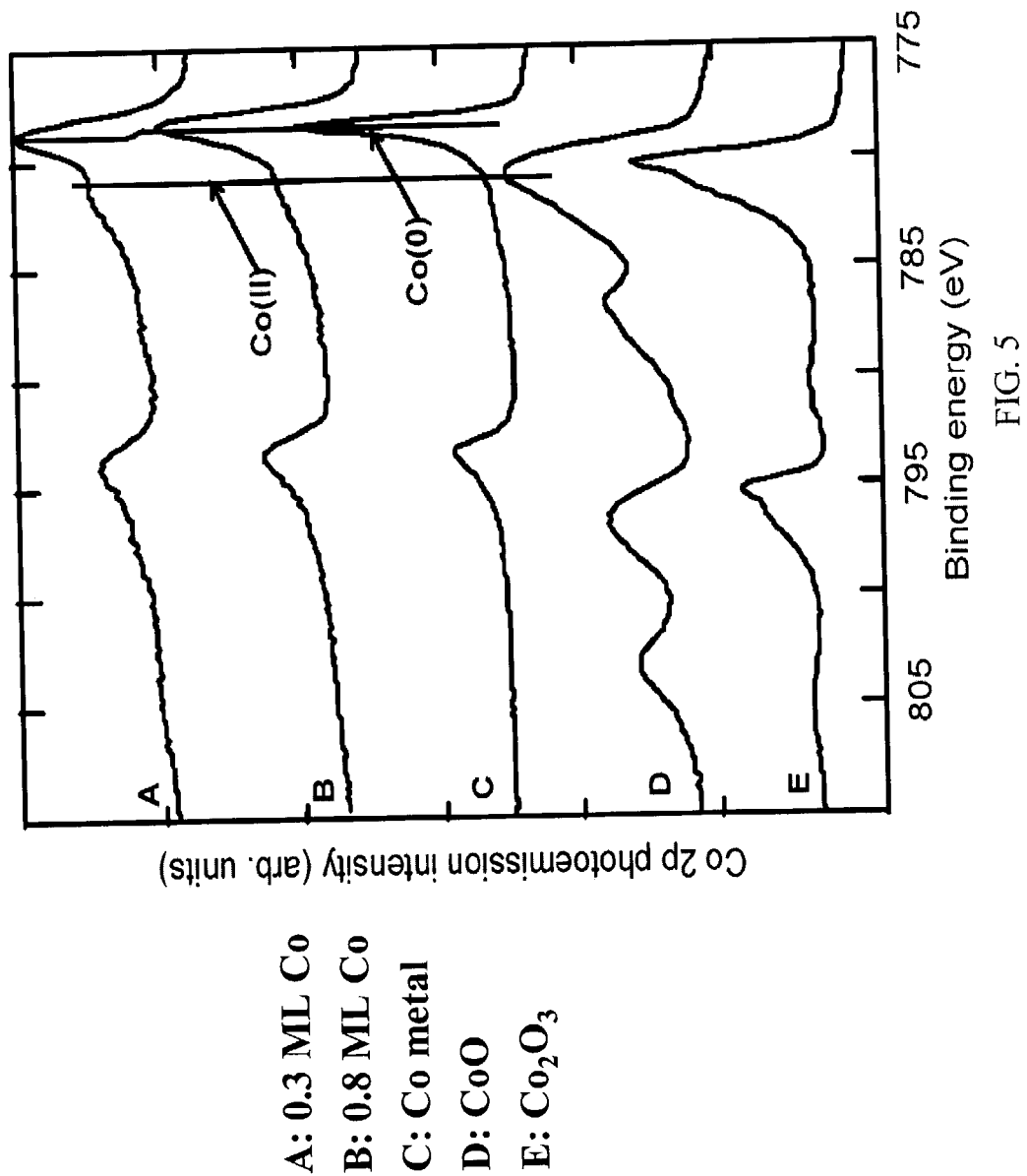
FIG. 5 shows X-ray Photoelectron Spectroscopy (XPS) data that demonstrate that a chemical reaction produces oxidized Co anchors within the top layer of the oxide surface.

The method of the chemical reaction (1) has been experimentally observed by the deposition of Co on hydroxylated alumina (FIG. 5) and supported by first principles calculations for many other metals. Reflection High Energy Electron Diffraction (RHEED) data demonstrated laminar metal growth of Co on alumina using the method of this invention. FIG. 5 shows X-ray Photoelectron Spectroscopy (XPS) data that demonstrates that a chemical reaction produces oxidized Co anchors within the top layer of the oxide surface. These bind otherwise diffusing neutral Co atoms leading to nanoislands (if the deposited metal is sub-ML) or mono- or bi-layers (if deposition is of one to two MLs) of the reactive metal.

The invention being thus described, it will be obvious that the same can be varied in many ways. Such variations are not to be regarded as a departure from the spirit and scope of the invention, and all such modifications as would be obvious to one skilled in the art are intended to be included within the scope of the following claims. It is also obvious that at higher than normal microelectronic manufacturing pressures, steps will have to be taken to prevent the surface negative species from attracting and binding contaminants from the environment. Such steps can include the simultaneous deposition of the metal with the material containing the negative species.

We claim:

1. A method for making a heterogeneous catalyst, comprising:
   cleaning the surface of a support material;
   introducing a negatively-charged species onto said surface of said support material; and
   depositing a catalytic metal on said surface in a closed environment under vacuum conditions at less than two monolayers of coverage of said catalytic metal.

2. The method of claim 1 wherein the step of depositing a catalytic metal on said surface provides less than approximately 0.5 ML of catalytic metal.

3. The method of claim 1 wherein the step of cleaning the surface uses a method selected from the group consisting of sonication in a solvent, sputter removal using an ion beam, burning using an oxygen plasma, burning using an ozone source, and annealing in an oxygen ambient.

4. The method of claim 1 wherein the negatively-charged species is introduced by exposure of said surface to atoms so as to produce negatively-charged species onto said oxide surface.

5. The method of claim 1 wherein the negatively-charged species is introduced by exposure of said surface to molecules that dissociate on said oxide surface to produce negatively-charged species.

6. The method of claim 1 wherein the negatively-charged species is introduced by reacting said oxide surface with a compound to produce negatively-charged species on said surface.

7. The method of claim 1 wherein said negatively-charged species are introduced onto said surface by exposing the surface to a material selected from the group consisting of oxygen, water, water plasma, hydroxide-containing compounds, oxygen plasma, ozone, $N_2O$, oxygen plasma in a hydrogen gas background, and halogens.

8. The method of claim 7 wherein said negatively-charged species is an hydroxyl ion at a coverage of approximately less than one-half ML.

9. The method of claim 8 wherein said coverage of approximately less than one-half ML is obtained by exposing said oxide surface to achieve approximately one ML coverage and heating to approximately 1000K, thereby reducing said approximately one ML coverage to a coverage of approximately less than one-half ML.

10. The method of claim 9 wherein said metal is selected from the group consisting of lithium, cobalt, potassium, yttrium, niobium, ruthenium, palladium, platinum, copper, silver, gold and aluminum.

11. The method of claim 1 wherein said negatively charged species is an hydroxyl ion at a coverage of greater than approximately 0.9 ML.

12. The method of claim 11 wherein said coverage of greater than approximately 0.9 ML is obtained by exposing said cleaned surface to approximately greater than one Torr of water.

13. The method of claim 1 wherein said surface comprises materials selected from the group consisting of boron, aluminum, gallium, indium, alkaline earth materials, transition metal oxides, and ceramics.

14. The method of claim 13 wherein said surface is aluminum.

15. The method of claim 1 wherein said surface is annealed in an oxygen environment to reduce the defects in the surface.

16. The method of claim 1 wherein the metal is deposited at a temperature below that which removes the negatively-charged species on the surface.

17. The method of claim 1 wherein the metal in introduced concurrently with the negatively-charged species.

18. The method of claim 1 wherein the metal deposited onto said surface is annealed.

19. The method of claim 1 wherein the said negatively-charged species is an hydroxyl group introduced by exposure of the surface to air with a humidity greater than approximately 5%.

20. The method of claim 1 further comprising the step of adding a promoter to said surface, said promoter selected from the group consisting of which include elements selected from lithium, sodium, magnesium, boron, potassium, calcium, barium, lanthanum, cerium, and thorium.

21. The method of claim 20 wherein said promoter is deposited on said surface concurrently with depositing said catalytic metal.

* * * * *